United States Patent Office 2,695,296
Patented Nov. 23, 1954

2,695,296
VAT DYESTUFFS

Jacob Koch, Basel, and Walter Kern, Sissach, Switzerland, assignors to Ciba Limited, Basel, Switzerland, a Swiss firm No Drawing. Application July 17, 1950,
Serial No. 174,361

Claims priority, application Switzerland July 21, 1949

8 Claims. (Cl. 260—276)

This invention is based on the observation that dicarbazoles obtainable from trianthrimides of the general formula

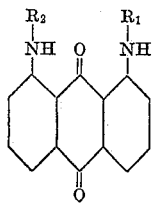

in which $R_1$ and $R_2$ each represent an anthraquinone radical bound to the imino group in the 1-position and at least one of which radicals contains an acridone ring fused on the 3:4-position are valuable vat dyestuffs.

The trianthrimides of the above general formula may be made, for example, by condensing one molecular proportion of a 1:8-dihalogen-anthraquinone, advantageously 1:8-dichloranthraquinone, with two molecular proportions of a 4-amino-anthraquinone-2:1(N)-1':2'(N)-benzacridone or in succession or simultaneously with one molecular proportion of such an anthraquinone-acridone and one molecular proportion of any desired 1-aminoanthraquinone. As the latter component it is of advantage to choose an aminoanthraquinone-acridone different from that constituting the first component or a 1-aminoanthraquinone which contains in a further α-position an acylamino group, advantageously a benzoylamino group, for example, 1-amino-4-, -5- or -8-benzoylaminoanthraquinone, in which case the benzoyl radical may contain substituents, especially of non-ionogenic character and of a molecular weight not exceeding about 130, such as halogen atoms, alkoxy groups, alkylsulfone groups and dialkyl sulfamide groups. The reaction may be carried out in a high boiling solvent which does not react with the starting materials, for example, in naphthalene or nitrobenzene, advantageously in the presence of one of the usual catalysts which promote anthrimide formation, such as copper or a copper salt and if desired with the addition of an acid-binding agent. As examples of such trianthrimides there may be mentioned products which are obtained by the reaction of one molecular proportion of 1:8-dichloranthraquinone with two molecular proportions of a 4-aminoanthraquinone-2:1(N)-1':2'(N)-benzacridone, or from one molecular proportion of 1:8-dichloranthraquinone, one molecular proportion of 4-aminoanthraquinone-2:1(N)-1':2'(N)-benzacridone and one molecular proportion of 1-amino-4-, -5- or -8-benzoylaminoanthraquinone, and also analogous products, especially those of asymmetrical character, in which the Bz-nucleus of the benzacridone ring contains halogen as a substituent.

As carbazolizing agents for treating the above mentioned trianthrimides in accordance with the present process there come into consideration, for example, titanium tetrachloride and especially aluminium chloride. The reaction may be carried out in a manner in itself known in the presence of a suitable solvent or diluent, for example, in the presence of a tertiary base such as pyridine, but advantageously in the presence of nitrobenzene or with the aid of the known addition products of sulfur dioxide and aluminium chloride.

The products so obtained correspond to the general formula

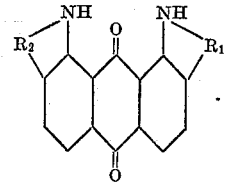

wherein $R_1$ and $R_2$ stand for an anthraquinone radical bound in 1-position to the —NH— group and wherein an acridone ring is fused on to at least one of the radicals $R_1$ and $R_2$ in its positions 3 and 4. They are valuable vat dyestuffs which are distinguished especially by good fastness to light and also by good properties of fastness in general. They may be used as pigment dyestuffs, or for dyeing or printing a very wide variety of fibers such as wool, silk and especially vegetable fibers such as cotton, linen, artificial silk and staple fibers of regenerated cellulose, and if desired they may be used in the form of their leuco-ester salts obtainable in known manner for dyeing or printing by the methods known for this class of dyestuffs.

The following examples illustrate the invention, the parts and percentages being by weight:

EXAMPLE 1

A. *Preparation of the trianthrimide.*—In a finely pulverized state 11.1 parts of 1:8-dichloranthraquinone, 28.6 parts of 4-aminoanthraquinone-2:1(N)-1':2'(N)-benzacridone, 8 parts of anhydrous sodium acetate, 4 parts of magnesium oxide and 2 parts of cuprous chloride are mixed with 200 parts of naphthalene. The mixture is heated, and the melt is stirred while gently boiling until the starting materials have disappeared. The whole is then allowed to cool to 160° C., diluted with 200 parts of monochlorobenzene, and stirred for one hour at 140–150° C. After cooling to about 90° C., the whole is filtered with suction. The filter residue is purified by treatment in turn with mono-chlorobenzene, alcohol, dilute hydrochloric acid and finally water, and then dried. The yield amounts to 90–95% of the theoretical yield. The dyestuff of the formula

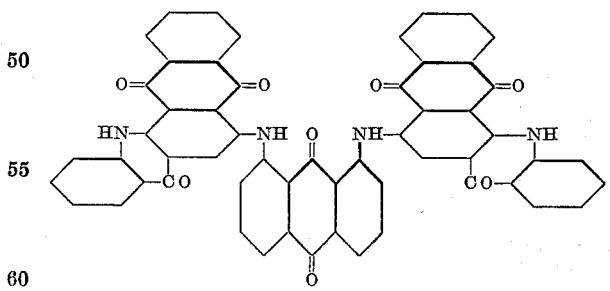

is a greenish-blue powder which dissolves in concentrated sulfuric acid with a brownish yellow coloration and dyes cotton from a violet-brown vat grey tints having very good properties of fastness.

B. *Carbazolization, first variant.*—12 parts of the trianthrimide obtained as described in paragraph A above are introduced in the course of ¼ hour at about 80–90° C. into a thinly fluid homogeneous melt which has been obtained from a mixture of 84 parts of sublimed aluminium chloride and 16.8 parts of dry powdered sodium chloride by passing dry sulfur dioxide gas through the mixture. The whole is stirred for a further hour at 90–100° C. while continuing to pass sulfur dioxide through the mixture. The fluid melt is then stirred into a mixture of 1500 parts of water and 400 parts of caustic soda solution of 36° Bé. The suspension which has become warm, is stirred for one hour at 70° C., and then filtered with suction. The washed residue is added to a mixture of 375 parts of water and 120 parts of sulfuric monohydrate. The suspension is stirred for one hour at 70° C., and then filtered with suction. The residue is washed until neutral and dried. The dyestuff so obtained is a dark powder of the formula

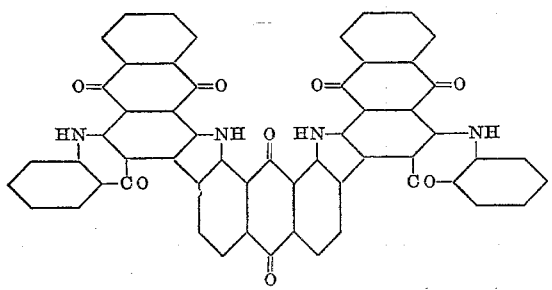

which dissolves in concentrated sulfuric acid with a blue coloration. It dyes cotton from an orange-brown vat blackish olive-brown tints having remarkable properties of fastness.

C. *Carbazolization, second variant.*—44.5 parts of sublimed aluminium chloride are strewn into 89 parts of nitrobenzene while stirring, whereupon the temperature of the resulting solution rises to about 70° C. The whole is allowed to cool to about 50° C., and then 8.9 parts of the trianthrimide obtained as described in paragraph A above are introduced in the course of ¼ hour. The whole is heated to 85° C., and stirred for one hour at 85–90° C. After cooling to room temperature, the thin melt is introduced into a mixture of 200 parts of water and 270 parts of caustic soda solution of 36° Bé., and the nitrobenzene is removed by steam distillation. The suspension which remains behind is filtered with suction, and the filter residue is washed until neutral and dried. The dyestuff so obtained is identical with that described in paragraph B above.

EXAMPLE 2

The procedure is the same as that described in Example 1 except that, instead of 4-aminoanthraquinone-2:1(N)-1':2'(N)-benzacridone, derivatives thereof chlorinated in the Bz- nucleus are used. Analgous dyestuffs are obtained. The properties of a few of these dyestuffs are given in the following tables, the first table relating to the trianthrimides and the second to the dicarbazoles.

*Trianthrimides*

| Acridone compound | Dyestuff | | |
|---|---|---|---|
| | Coloration of solution in concentrated $H_2SO_4$ | Color of vat | Tint of dyeing on cotton |
| 4-aminoanthraquinone-2:1(N)-1':2'(N)-5'-chlorobenzacridone. | Green-blue | Red-brown | Greenish grey. |
| 4-aminoanthraquinone-2:1(N)-1':2'(N)-6'-chlorobenzacridone. | Blue-red | do | Bluish grey. |
| 4-aminoanthraquinone-2:1(N)-1':2'(N)-3':5'-dichlorobenzacridone. | Brown | do | Greenish grey. |

*Dicarbazoles*

| Acridone compound | Dyestuff | | |
|---|---|---|---|
| | Coloration solution in concentrated $H_2SO_4$ | Color of vat | Tint of dyeing on cotton |
| 4-aminoanthraquinone-2:1(N)-1':2'(N)-5'-chlorobenzacridone. | Red-blue | Brown | Brownish olive. |
| 4-aminoanthraquinone-2:1(N)-1':2'(N)-6'-chlorobenzacridone. | Blue-grey | do | Slate grey. |
| 4-aminoanthraquinone-2:1(N)-1':2'(N)-3':5'-dichlorobenzacridone. | Violet | do | Greenish olive. |

EXAMPLE 3

A. *Preparation of the trianthrimide.*—In a finely powdered condition 13.8 parts of 1:8-dichloranthraquinone, 17 parts of 4-aminoanthraquinone-2:1(N)-1':2'(N)-benzacridone, 5 parts of anhydrous sodium acetate, 2.5 parts of magnesium oxide and 1.5 parts of cuprous chloride are added to 135 parts of nitrobenzene. The whole is heated and stirred at a gentle boil until the starting products have disappeared. After cooling to about 90° C. the whole is filtered with suction. The filter residue is purified by treatment with alcohol, dilute hydrochloric acid and water, and then dried. The yield amounts to 85–90 per cent of the theoretical yield. The compound is a dark greenish blue powder which dissolves in concentrated sulfuric acid with a brown-yellow coloration.

In a finely powdered condition 17.45 parts of the product so obtained, 10.8 parts of 1-amino-4-benzoylaminoanthraquinone, 3 parts of anhydrous sodium acetate, 1.5 parts of magnesium oxide and 1 part of cuprous chloride are mixed with 140 parts of naphthalene. The whole is heated and the melt is stirred at a gentle boil until the starting products have disappeared. The whole is then allowed to cool to about 160° C., diluted with monochlorobenzene, and worked up as described in paragraph A of Example 1. The yield amounts to 80–90 per cent of the theoretical yield. The compound so obtained is a dark blue powder of the formula

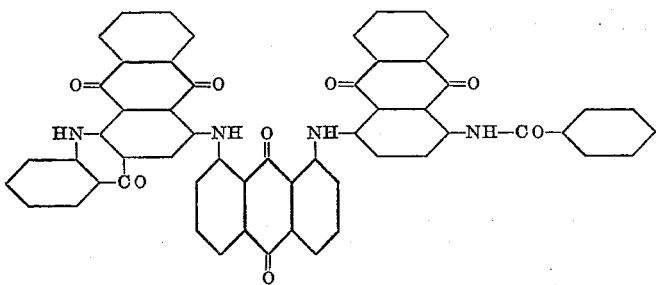

which dissolves in concentrated sulfuric acid with a yellowish olive green coloration and dyes cotton from an orange-brown vat grey tints having very good properties of fastness.

B. *Carbazolization.*—The trianthrimide obtained as described in the preceding paragraph is treated as described in paragraph B or C of Example 1, and there is obtained a dyestuff which dissolves in concentrated sulfuric acid with a violet coloration. It dies cotton from an orange-brown vat yellowish brown tints having remarkable properties of fastness.

EXAMPLE 4

By using the first paragraph of Example 3 a derivative of 4-aminoanthraquinone-2:1(N)-1':2'(N)-benzacridone chlorinated in the benzene nucleus and/or in accordance with the second paragraph of the same example another 1-amino-α-acylaminoanthraquinone, instead of 1-amino-4-benzoylaminoanthraquinone, analogous dyestuffs are obtained. The properties of a number of such dyestuffs are given in the following tables, the first table relating to the trianthrimides and the second table to the dicarbazoles:

Trianthrimides

| Outer components | | Dyestuff | | |
| --- | --- | --- | --- | --- |
| Acridone compound | Amino-acylamino-anthraquinone | Coloration of solution in concentrated H₂SO₄ | Color of vat | Tint of dyeing on cotton |
| 4-aminoanthraquinone-2:1(N)-1′:2′(N)-benzacridone. | 1-amino-4-(paramethylsulfonyl)-benzoylamino-anthraquinone. | Yellowish olive green | Red-brown | Grey. |
| Do | 1-amino-4-(para-[N-dimethyl]-sulfonamido)-benzoylamino-anthraquinone. | ____do____ | ____do____ | Do. |
| Do | 1-amino-5-benzoylamino-anthraquinone. | Lilac | Orange brown | Violetish grey. |
| Do | 1-amino-8-benzoylamino-anthraquinone. | Orange yellow | ____do____ | Do. |
| 4-aminoanthraquinone-2:1(N)-1′:2′(N)-5′-chlorobenzacridone. | 1-amino-5-benzoylamino-anthraquinone. | Red-brown | Bordeaux | Violetish brown. |
| 4-aminoanthraquinone-2:1(N)-1′:2′(N)-6′-chlorobenzacridone. | ____do____ | ____do____ | Orange brown | Grey. |
| 4-aminoanthraquinone-2:1(N)-1′:2′(N)-3′:5′-dichlorobenzacridone. | ____do____ | ____do____ | Bordeaux | Reddish black-brown. |

Dicarbazoles

| Outer components | | Dyestuff | | |
| --- | --- | --- | --- | --- |
| Acridone compound | Amino-acylamino-anthraquinone | Coloration of solution in concentrated H₂SO₄ | Color of vat | Tint of dyeing on cotton |
| 4-aminoanthraquinone-2:1(N)-1′:2′(N)-benzacridone. | 1-amino-4-(paramethylsulfonyl)-benzoylamino-anthraquinone. | Blue | Red-brown | Yellowish brown. |
| Do | 1-amino-4-(para-[N-dimethyl]-sulfonamido-benzoylamino-anthraquinone. | ____do____ | Orange-brown | Do. |
| Do | 1-amino-5-benzoyl-amino-anthraquinone. | ____do____ | ____do____ | Do. |
| Do | 1-amino-8-benzoyl-amino-anthraquinone. | ____do____ | Yellow-brown | Black-brown. |
| 4-aminoanthraquinone-2:1(N)-1′:2′(N)-5′-chlorobenzacridone. | 1-amino-5-benzoyl-amino-anthraquinone. | ____do____ | Brown | Yellowish brown. |
| 4-aminoanthraquinone-2:1(N)-1′:2′(N)-6′-chlorobenzacridone. | ____do____ | ____do____ | Orange-brown | Do. |
| 4-aminoanthraquinone-2:1(N)-1′:2′(N)-3′:5′-dichlorobenzacridone. | ____do____ | ____do____ | Brown | Do. |

EXAMPLE 5

By reacting the dianthrimide obtainable as described in the first paragraph of Example 3 with 5-amino- or 8-amino-anthraquinone-2:1(N)-1′:2′(N)-benzacridone, instead of 1-amino-4-benzoylaminoanthraquinone, in the manner described in the second paragraph of that example, there are likewise obtained asymmetrical trianthrimides which are likewise converted into dicarbazoles by the treatment described in paragraph B or C of Example 1. The properties of these dyestuffs are given in the following tables, the first table relating to the trianthrimides and the second table to the dicarbazoles.

EXAMPLE 6

1.5 parts of the vat dyestuff obtained as described in paragraph B or C of Example 1 are vatted in 6 parts by volume of caustic soda solution of 36° Bé. and 3 parts of sodium hydrosulfite at about 50° C. in 300 parts of water. This stock vat is added to a dyebath containing, in 1700 parts of water, 4 parts by volume of caustic soda solution of 36° Bé. and 2 parts of sodium hydrosulfite, and 100 parts of cotton are entered at 40° C. After 15 minutes 20 parts of sodium chloride are added, and dyeing is carried on at 40–50° C. for one hour. The cotton is then squeezed, oxidised in the air, rinsed, acidified and again rinsed, and if desired soaped at the

Trianthrimides

| First acridone component | Second acridone component | Dyestuff | | |
| --- | --- | --- | --- | --- |
| | | Coloration of solution in concentrated H₂SO₄ | Color of vat | Tint of dyeing on cotton |
| 4-aminoanthraquinone-2:1(N)-1′:2′(N)-benzacridone. | 5-aminoanthraquinone-2:1(N)-1′:2′-(N)-benzacridone. | Orange | Bordeaux | Blackish-violet. |
| Do | 8-aminoanthraquinone-2:1(N)-1′:2′-(N)-benzacridone. | ___do___ | ____do____ | Bluish grey. |

Dicarbazoles

| First acridone component | Second acridone component | Dyestuff | | |
| --- | --- | --- | --- | --- |
| | | Coloration of solution in concentrated H₂SO₄ | Color of vat | Tint of dyeing on cotton |
| 4-aminoanthraquinone-2:1(N)-1′:2′(N)-benzacridone. | 5-aminoanthraquinone-2:1(N)-1′:2′-(N)-benzacridone. | Violet | Red-brown | Violetish black-brown. |
| Do | 8-aminoanthraquinone-2:1(N)-1′:2′-(N)-benzacridone. | ___do___ | ____do____ | Blackish brown. | boil. The cotton is dyed a fast blackish-olive brown tint.

What we claim is:

1. An anthraquinone vat dyestuff of the formula

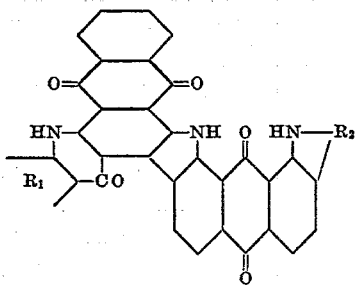

wherein $R_1$ stands for mononuclear carbocyclic aryl, and $R_2$ stands for anthraquinonyl containing one 9:10-dioxoanthracene nucleus and bound to the adjacent —NH— group in an α-position.

2. An anthraquinone vat dyestuff of the formula

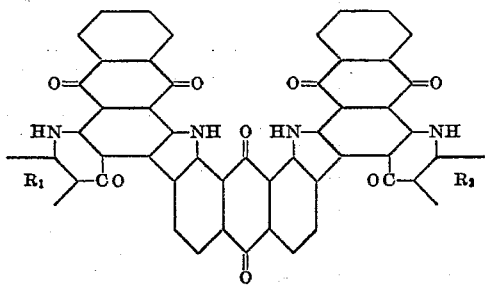

wherein $R_1$ and $R_2$ each stands for mononuclear carbocyclic aryl.

3. An anthraquinone vat dyestuff of the formula

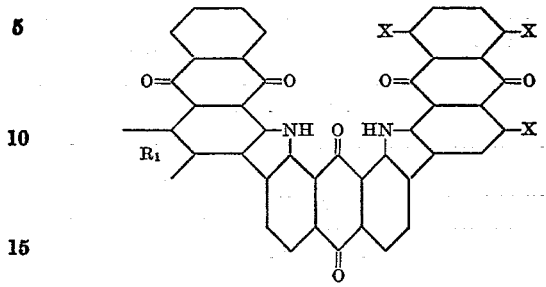

wherein $R_1$ stands for mononuclear carbocyclic aryl, two X's represent hydrogen atoms and one X represents a group of the formula —NH—CO—$R_3$ in which $R_3$ stands for mononuclear carbocyclic aryl.

4. The dyestuff of the formula

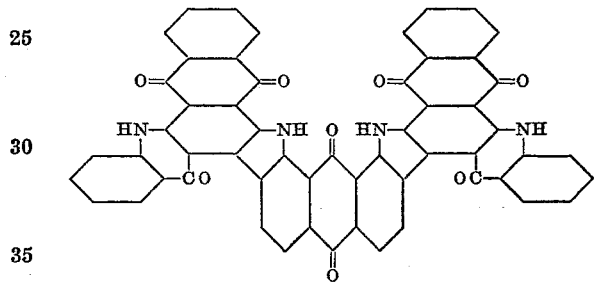

5. The dyestuff of the formula

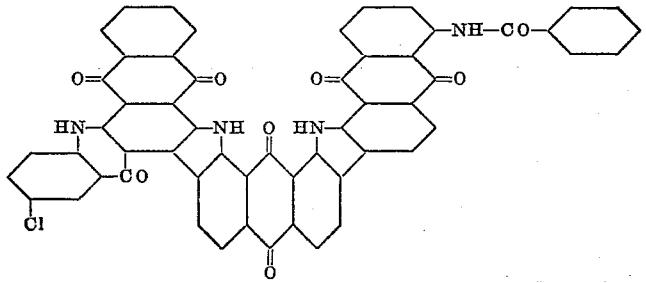

6. The dyestuff of the formula

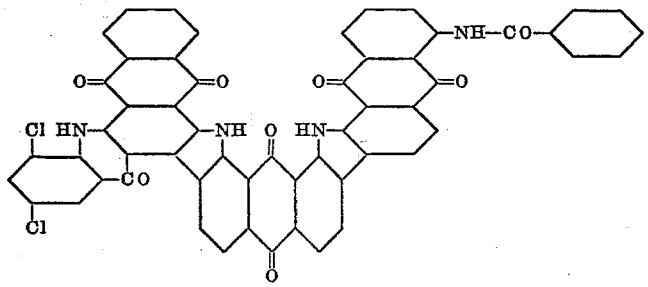

7. The dyestuff of the formula

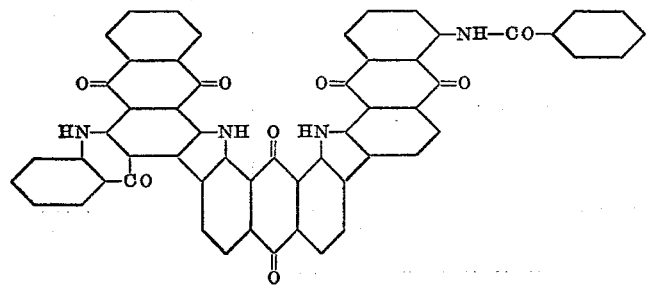

8. The dyestuff of the formula
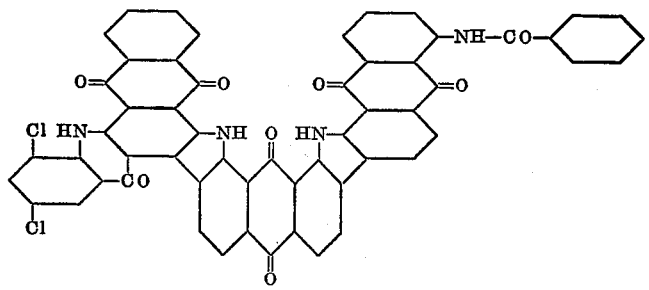
References Cited in the file of this patent
UNITED STATES PATENTS
| Number | Name | Date |
|---|---|---|
| 1,781,238 | Mieg | Nov. 11, 1930 |
| 1,878,965 | Mieg | Sept. 20, 1932 |
| 1,969,210 | Dettwyler et al. | Aug. 7, 1934 |
| 2,036,663 | Weiland et al. | Apr. 7, 1936 |
| 2,212,965 | Weiners | Aug. 27, 1940 |
| 2,315,537 | Miller | Apr. 6, 1943 |
FOREIGN PATENTS
| Number | Country | Date |
|---|---|---|
| 211,493 | Switzerland | Dec. 2, 1940 |
| 719,345 | Germany | Apr. 11, 1942 |